(12) United States Patent
Bhandarkar et al.

(10) Patent No.: US 10,432,085 B2
(45) Date of Patent: Oct. 1, 2019

(54) DIGITAL CONTROL OF SWITCHED BOUNDARY MODE PFC POWER CONVERTER FOR CONSTANT CROSSOVER FREQUENCY

(71) Applicant: Microchip Technology Incorporated, Chandler, AZ (US)

(72) Inventors: Santosh Manjunath Bhandarkar, Chandler, AZ (US); Alex Dumais, Gilbert, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 16/165,384

(22) Filed: Oct. 19, 2018

(65) Prior Publication Data

US 2019/0199204 A1 Jun. 27, 2019

Related U.S. Application Data

(63) Continuation-in-part of application No. 16/052,208, filed on Aug. 1, 2018, and a continuation-in-part of
(Continued)

(51) Int. Cl.
*H02M 1/42* (2007.01)
*H02M 3/156* (2006.01)
(Continued)

(52) U.S. Cl.
CPC ....... *H02M 1/4225* (2013.01); *H02M 3/1563* (2013.01); *H02M 7/217* (2013.01);
(Continued)

(58) Field of Classification Search
CPC .......... G05F 1/565; H02M 2001/0058; H02M 1/083; H02M 1/143; H02M 1/4225; H02M 3/157
(Continued)

(56) References Cited

U.S. PATENT DOCUMENTS 6,448,745 B1   9/2002   Killat ............................ 323/222
8,098,505 B1   1/2012   Choi ............................. 363/89
(Continued)

FOREIGN PATENT DOCUMENTS

WO   2006/029323 A2   3/2006   ............... H02H 3/20

OTHER PUBLICATIONS

International Search Report and Written Opinion, Application No. PCT/US2018/045479, 12 pages, dated Oct. 19, 2018.
(Continued)

*Primary Examiner* — Gary A Nash
(74) *Attorney, Agent, or Firm* — Slayden Grubert Beard PLLC

(57) ABSTRACT

A circuit arrangement for switched boundary mode power conversion, a corresponding signal processor and a method of switched boundary mode power conversion are provided. The circuit arrangement comprises an input for receiving an input voltage from a power supply, an output to provide an output voltage to a load, an energy storage device, a controllable switching device, and a signal processor. The signal processor is connected to the controllable switching device and being configured for zero-current switching of the switching device. The signal processor is further configured to determine an on-time period for the switching device in one or more switching cycles based on the output voltage and the output of a crossover frequency control module to provide an improved transient response characteristic of the circuit arrangement.

19 Claims, 12 Drawing Sheets

Related U.S. Application Data application No. 16/052,026, filed on Aug. 1, 2018, and a continuation-in-part of application No. 16/051,872, filed on Aug. 1, 2018.

(60) Provisional application No. 62/575,798, filed on Oct. 23, 2017.

(51) Int. Cl.
  H02M 7/217 (2006.01)
  *H02M 3/157* (2006.01)
  *H02M 1/00* (2006.01)
  *G05F 1/565* (2006.01)
  *H02M 1/08* (2006.01)
  *H02M 1/14* (2006.01)

(52) U.S. Cl.
  CPC ............ *G05F 1/565* (2013.01); *H02M 1/083* (2013.01); *H02M 1/143* (2013.01); *H02M 3/157* (2013.01); *H02M 2001/0019* (2013.01); *H02M 2001/0022* (2013.01); *H02M 2001/0032* (2013.01); *H02M 2001/0058* (2013.01); *H02M 2003/1566* (2013.01)

(58) Field of Classification Search
  USPC .......................................... 323/275, 283–285
  See application file for complete search history.

(56) References Cited

U.S. PATENT DOCUMENTS

| | | | | |
|---|---|---|---|---|
| 8,406,021 | B2 | 3/2013 | Green | 363/89 |
| 8,901,901 | B2 | 12/2014 | Ziegler et al. | 323/271 |
| 9,240,712 | B2 | 1/2016 | Chandrasekaran | |
| 9,973,089 | B1 | 5/2018 | Terasawa et al. | |
| 10,164,521 | B2 | 12/2018 | Castelli | |
| 2005/0018458 | A1* | 1/2005 | Shimada | H02M 1/4225 363/125 |
| 2006/0077604 | A1 | 4/2006 | Jansen | 361/90 |
| 2008/0205103 | A1 | 8/2008 | Sutardja et al. | 363/84 |
| 2008/0246444 | A1* | 10/2008 | Shao | H02M 1/4225 323/207 |
| 2009/0206805 | A1 | 8/2009 | Choi et al. | 323/271 |
| 2009/0257257 | A1 | 10/2009 | Adragna et al. | 363/65 |
| 2009/0267658 | A1 | 10/2009 | Bridge et al. | 327/141 |
| 2010/0097828 | A1 | 4/2010 | Chen | 363/72 |
| 2010/0165683 | A1* | 7/2010 | Sugawara | H02M 1/4225 363/126 |
| 2010/0244789 | A1 | 9/2010 | Osaka | 323/271 |
| 2011/0110134 | A1 | 5/2011 | Gaboury et al. | 363/126 |
| 2011/0149622 | A1 | 6/2011 | Lin | 363/124 |
| 2012/0092905 | A1 | 4/2012 | Srighakollapu et al. | 363/37 |
| 2012/0224401 | A1 | 9/2012 | Phadke | 363/84 |
| 2012/0244789 | A1 | 9/2012 | Sheu | 451/388 |
| 2012/0262958 | A1 | 10/2012 | Feldtkeller et al. | 363/44 |
| 2014/0103861 | A1* | 4/2014 | Carletti | H02M 1/4225 320/107 |
| 2014/0176089 | A1 | 6/2014 | Yang et al. | 323/207 |
| 2014/0334196 | A1 | 11/2014 | Chen et al. | 363/21.04 |
| 2014/0362614 | A1* | 12/2014 | Koga | H02M 1/4225 363/21.17 |
| 2015/0146458 | A1* | 5/2015 | Lim | H02M 3/158 363/44 |
| 2016/0105096 | A1* | 4/2016 | Chen | H02M 1/4225 323/210 |
| 2016/0276924 | A1* | 9/2016 | Castelli | H02M 1/42 |
| 2018/0020515 | A1 | 1/2018 | Rutgers | |
| 2018/0109191 | A1 | 4/2018 | Chan et al. | |
| 2019/0052179 | A1 | 2/2019 | Bhandarkar et al. | |

OTHER PUBLICATIONS

International Search Report and Written Opinion, Application No. PCT/US2018/045492, 10 pages, dated Nov. 7, 2018.

International Search Report and Written Opinion, Application No. PCT/US2018/045485, 10 pages, dated Nov. 27, 2018.

Morroni, Jeffrey et al., "Design and Implementation of an Adaptive Tuning System Based on Desired Phase Margin for Digitally Controlled DC-DC Converters," IEEE Transactions on Power Electronics, vol. 24, No. 2, pp. 559-564, Feb. 1, 2009.

Juang, Kai-Cheung et al., "A Grid-Tied Flyback-Based PV Inverter with BCM Variable Frequency Voltage Mode Control," IEEE International Symposium on Intelligent Signal Processing and Communication Systems, pp. 598-603, Nov. 4, 2012.

Ryan, Robert T. et al., "Digital Control of an Interleaved BCM Boost PFC Converter with Fast Transient Response at Low Input Voltage," IEEE Energy Conversion Congress and Exposition, pp. 257-264, Oct. 1, 2017.

U.S. Non-Final Office Action, U.S. Appl. No. 16/052,208, 13 pages, dated Dec. 13, 2018.

U.S. Non-Final Office Action, U.S. Appl. No. 16/051,872, 14 pages, dated Dec. 28, 2018.

International Search Report and Written Opinion, Application No. PCT/US2018/056989, 17 pages, dated Jan. 31, 2019.

U.S. Final Office Action, U.S. Appl. No. 16/052,208, 19 pages, dated Jun. 5, 2019.

U.S. Non-Final Office Action, U.S. Appl. No. 16/052,026 29 pages, dated Apr. 4, 2019.

U.S. Final Office Action, U.S. Appl. No. 16/051,872, 23 pages, dated Jun. 26, 2019.

* cited by examiner

DIGITAL CONTROL OF SWITCHED BOUNDARY MODE PFC POWER CONVERTER FOR CONSTANT CROSSOVER FREQUENCY

RELATED PATENT APPLICATION

This application claims priority to U.S. Provisional Patent Application No. 62/575,798 filed Oct. 23, 2017, the entire contents of which are hereby incorporated by reference for all purposes. This application also claims priority to U.S. patent application Ser. No. 16/052,208 filed Aug. 1, 2018, the entire contents of which are hereby incorporated by reference for all purposes. This application also claims priority to U.S. patent application Ser. No. 16/052,026 filed Aug. 1, 2018, the entire contents of which are hereby incorporated by reference for all purposes. This application also claims priority to U.S. patent application Ser. No. 16/051,872 filed Aug. 1, 2018, the entire contents of which are hereby incorporated by reference for all purposes.

TECHNICAL FIELD

The present disclosure relates to power converters and, more particularly, to control of a switched boundary mode power converter.

BACKGROUND

Power converters and in particular switched-mode power converters are used in a variety of applications to provide AC/DC and DC/DC conversion. For example, switched-mode power converters, also referred to as switched-mode power supplies (SMPS), are widely used in computer and mobile phone power supply units to provide the necessary operating voltages from typical 120V/240V AC mains lines.

Typical items of concern when designing power converters relate to conversion efficiency and cost. It should be readily apparent that power losses should be minimized to increase the overall efficiency of the converter and also to reduce the generation of heat, which may be difficult to dissipate depending on the design and the respective application.

It is known to operate switched-mode power converters in boundary conduction mode or short "boundary mode" (BCM). Unlike a continuous operation in CCM (continuous conduction mode), in boundary conduction mode it is aimed to operate the switch of the power converter when no or no substantial current flows through the switch. This operational mode reduces switching losses and also allows to use less expensive components, for example less expensive boost diodes in a boost switched-mode power converter setup due to no reverse-recovery losses. In addition, BCM also allows for power factor correction (PFC), in view that the input current follows the input voltage waveform.

A by-product of BCM is that the converter inherently uses a variable switching frequency. The frequency depends primarily on the selected output voltage, the instantaneous value of the input voltage, the parameters of the energy storage used, e.g., inductance or capacitance and the output power delivered to the load. The lowest frequency occurs at the peak of sinusoidal line voltage.

A typical design consideration for switched-mode power converters relates to transient response, i.e., how the converter reacts upon a sudden change of the output load. When the circuit is not carefully designed, oscillations may occur when a transient is applied that only subdue slowly or do not subdue at all. Therefore, circuit designers typically determine system stability, in particular in terms of phase margin and gain margin, when designing a switched-mode power converter.

In particular when using BCM operation, the inherent variable switching frequency of the converter may be problematic for system stability and in particular for transient response characteristic.

SUMMARY

An object thus exists to provide a cost-effective circuit arrangement and method for switched-mode power conversion that allows to operate in boundary conduction mode with an improved transient response.

The object is solved by a circuit arrangement, a signal processor, and a method for switched boundary mode power conversion. The dependent claims as well as the following description contain various embodiments of the invention.

In one aspect, a circuit arrangement for switched boundary mode power conversion is provided that comprises at least an input for receiving an input voltage from a power supply; an output to provide an output voltage to a load; an energy storage device; a controllable switching device; and a signal processor, connected with the controllable switching device and being configured for zero-current switching of the switching device. According to the present aspect, the signal processor is further configured to determine an on-time period for the switching device in one or more switching cycles based on the output voltage and the output of a crossover frequency control module to provide an improved transient response characteristic of the circuit arrangement.

A basic idea of the invention is based on the recognition of the present inventors, that the transient response characteristic of a boundary conduction mode (BCM) power converter is related to the crossover frequency of the open loop gain of the converter. Accordingly, controlling the open loop gain crossover frequency advantageously allows to provide a more consistent transient response over the entire input voltage range.

BRIEF DESCRIPTION OF THE DRAWINGS

The above and other objects, features, and advantages of the current invention will become apparent from the following discussion of various embodiments. In the FIGS.

DETAILED DESCRIPTION

Figure 1:
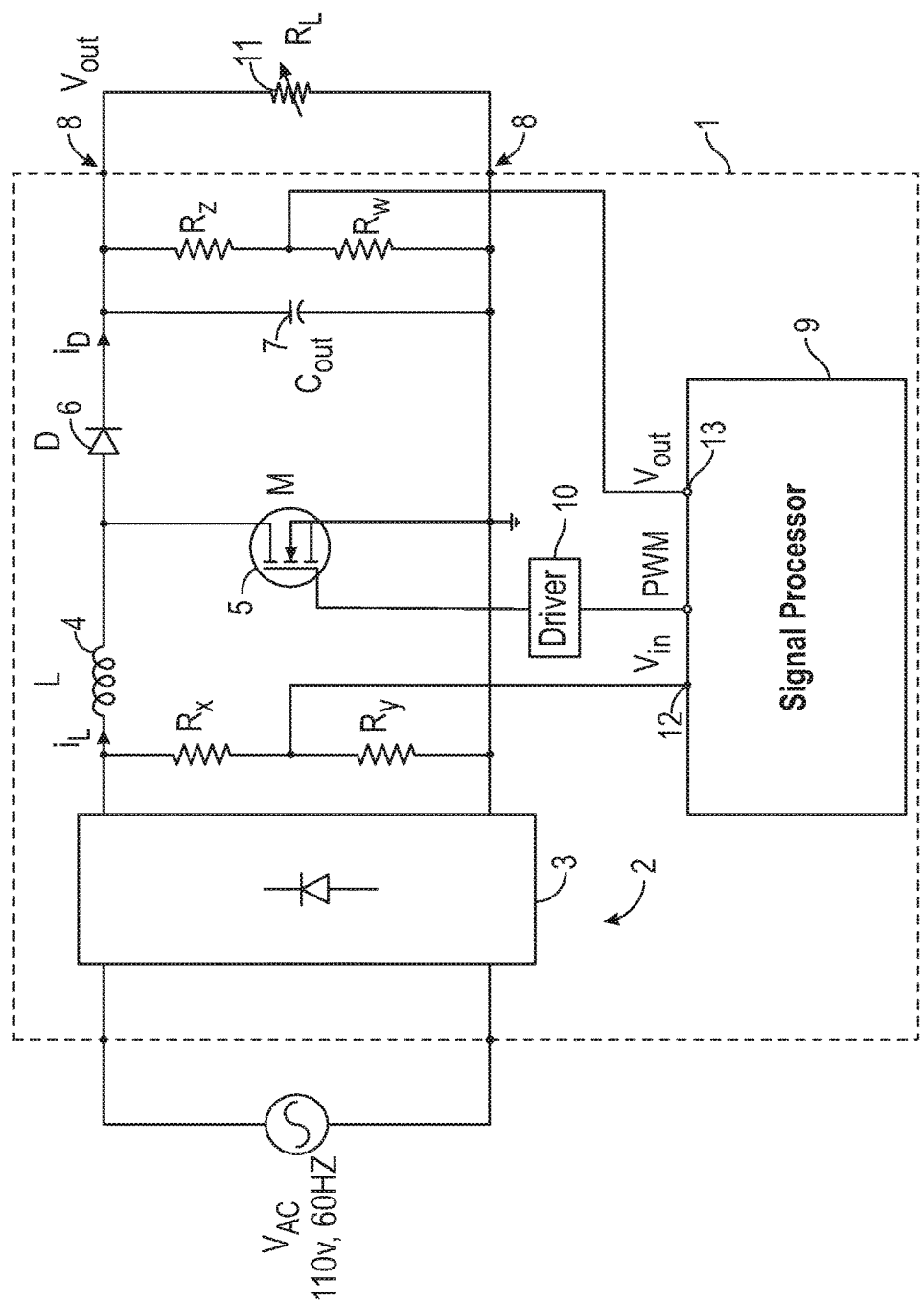
FIG. 1 shows a schematic block diagram of an embodiment of a circuit arrangement for switched boundary mode power conversion.

Technical features described in this application can be used to construct various embodiments of integrated circuit devices. Some embodiments of the invention are discussed so as to enable one skilled in the art to make and use the invention.

As discussed in the preceding and in a first aspect, a circuit arrangement for switched boundary mode power conversion is provided that comprises at least an input for receiving an input voltage from a power supply; an output to provide an output voltage to a load; an energy storage device; a controllable switching device; and a signal processor, connected with the controllable switching device and being configured for zero-current switching of the switching device. According to the present aspect, the signal processor is further configured to determine an on-time period for the switching device in one or more switching cycles based on the output voltage and the output of a crossover frequency control module to provide an improved transient response characteristic of the circuit arrangement.

In the context of the present discussion, the term "switched boundary mode power conversion" is understood as switched-mode electric power conversion in boundary conduction mode (BCM). A corresponding converter circuit comprises at least an energy storage device and a switching device for storing input energy temporarily and then releasing that energy to the output at a different voltage.

In BCM, a new switching period is initiated when the current through the energy storage device returns to zero, which is at the boundary of continuous conduction (CCM) and discontinuous conduction mode (DCM).

An "energy storage device" in the present context is understood as a device for storing electrical energy at least temporarily. For example, an energy storage device may comprise one or more inductors/inductances and/or one or more capacitors/capacitances.

The switching device in the present context may be of any suitable type to control an electrical current. The switching device may comprise for example one or more semiconductor switches, such as bipolar transistors, field-effect transistors, MOSFETs, IGBTs, SiCs, GANs etc.

According to the present aspect, the circuit arrangement comprises the signal processor. In this context, a signal processor is understood as a device that allows for cycled controlling of the switching device, for example according to a puke-width-modulation (PWM) with a frequency in the kHz range. In some examples, the signal processor is configured to control the switch in PWM with a frequency of approximately 500 kHz, in some embodiments, the signal processor is a digital signal processor (DSP), which allows faster execution of routines for zero-current determination.

The signal processor according to the present aspect is configured for zero-current switching. In this context, "zero-current switching" is understood as controlling the switching device when no or just a minor current of, e.g., less than 100 µA is flowing. As will be apparent in view that the circuit arrangement is configured for boundary conduction mode operation, zero-current switching in particular relates to the control from an off state, i.e., non-conductive state of the switching device, to an on state, i.e., a conductive state of the switching device when no or just a minor current is flowing.

A "zero-current point" of the energy storage device in the context of the present explanation is understood as the point in time when the energy storage device is completely discharged after a charge/discharge cycle, also referred to as "switching cycle" herein.

A "switching cycle" in this context is understood as the combined time of the respective controllable switching device being set conductive, i.e., in the on-state (also referred to as "on-time period" in the following), and the controllable switching device subsequently being set non-conductive, i.e., in the off-state. In case of a PWM control, the switching cycle corresponds to the PWM cycle time T.

A "mid-cycle" time corresponds to half the switching cycle period and is thus a point in time in each switching cycle that is equally spaced between two subsequent zero-current points of the energy storage device.

According to the present aspect, the signal processor is further configured to determine the on-time period based on the output voltage and the output of a crossover frequency control module, the latter of which may be of any suitable type (hardware and/or software) to control the open loop gain crossover frequency of the circuit arrangement. While the output voltage may be used as an indication of the power needed at the output, the crossover frequency control module serves to "correct" the on-time period when necessary to allow to control the crossover frequency of the circuit arrangement and thus, the transient response characteristic.

In some embodiments, the input voltage, applied to the input, is an AC voltage. The AC voltage in some embodiments may be an alternating voltage, having positive and negative half-cycles. Alternatively and in some embodiments, the AC voltage may be an at least partially rectified AC voltage, so that only positive half-cycles are present. While in some embodiments, the AC voltage is a sinusoidal voltage, the AC voltage may show different waveforms in according embodiments.

In some embodiments, the signal processor is configured to sample at least one of input voltage and the output voltage signal at a sampling time in each switching cycle, wherein the sampling time depends on the input voltage. In some embodiments, the signal processor is configured to set the sampling time to a mid-cycle time in case the input voltage is greater than half of the output voltage, which mid-cycle time is equally spaced between two subsequent zero-current points of the energy storage device.

In some embodiments, the signal processor is configured to set the sampling time substantially to a zero-current point in case the input voltage corresponds to or is less than half of the output voltage.

In some embodiments, the energy storage device is an inductor. In some embodiments, the switching device is a MOSFET. In some embodiments, the circuit arrangement is a boost converter. In some embodiments, the circuit arrangement further comprises a rectifier circuit to rectify an AC input voltage.

Reference will now be made to the drawings in which the various elements of embodiments will be given numerical designations and in which further embodiments will be discussed.

Specific references to components, modules, units, devices, sections, parts, process steps, and other elements are not intended to be limiting. Further, it is understood that like parts bear the same or similar reference numerals, when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

FIG. 1 shows a schematic block diagram of an embodiment of a circuit arrangement for switched boundary mode power conversion, namely in the instant embodiment, a switched-mode BCM boost converter circuit 1.

The boost converter circuit 1 comprises an input or input stage 2, configured for connection to a typical mains connection, e.g., at 11.0V, 60 Hz or 240V, 50 Hz. A bridge rectifier 3 is provided at the input 2 to obtain positive half-waves. The boost converter circuit 1 further comprises an energy storage device in the form of an inductor 4, MOSFET switching device 5, boost diode 6, output capacitor 7, output 8, signal processor 9, and pulse-width-modulation (PWM) driver 10.

The general operation of circuit 1 corresponds to that of a typical boost converter: inductor 4 is charged when MOSFET 5 is in the on state. Once inductor 4 is charged, MOSFET 5 is switched to the off state, so that the only remaining current path is through the boost diode 6 and load 11, the latter of which is shown in FIG. 1 as a variable resistance. The voltage increases in view of the increased power from both, the inductance 4 and the input 2. The energy stored in the inductor 4 during the on state is discharged into the load 11 through diode 6, when the MOSFET 5 is in the off state.

The operation of circuit 1 is controlled by signal processor 9 and PWM driver 10. As shown, signal processor 9 is connected to PWM driver 10 and provides a PWM control signal to the driver 10. The driver 10 controls the MOSFET 5 and comprises a level shifter, which changes the drive signal from 0-3.3V to the levels required by MOSFET 5, e.g., in this embodiment 0-12V. Additionally, PWM driver 10 drives the MOSFET 5 with faster rise and fall times, which are beneficial for reducing switching losses. The MOSFET ON voltage decides its resistance. Higher voltage leads to lower ON resistance.

The signal processor 9 in the present embodiment is a digital signal processor of dsPIC33EP series type, available from Microchip Technology Inc., Chandler, Ariz., USA. As discussed in the preceding, the circuit 1 is configured for boundary conduction mode (BCM) operation, which is controlled by signal processor 9.

Figure 2:
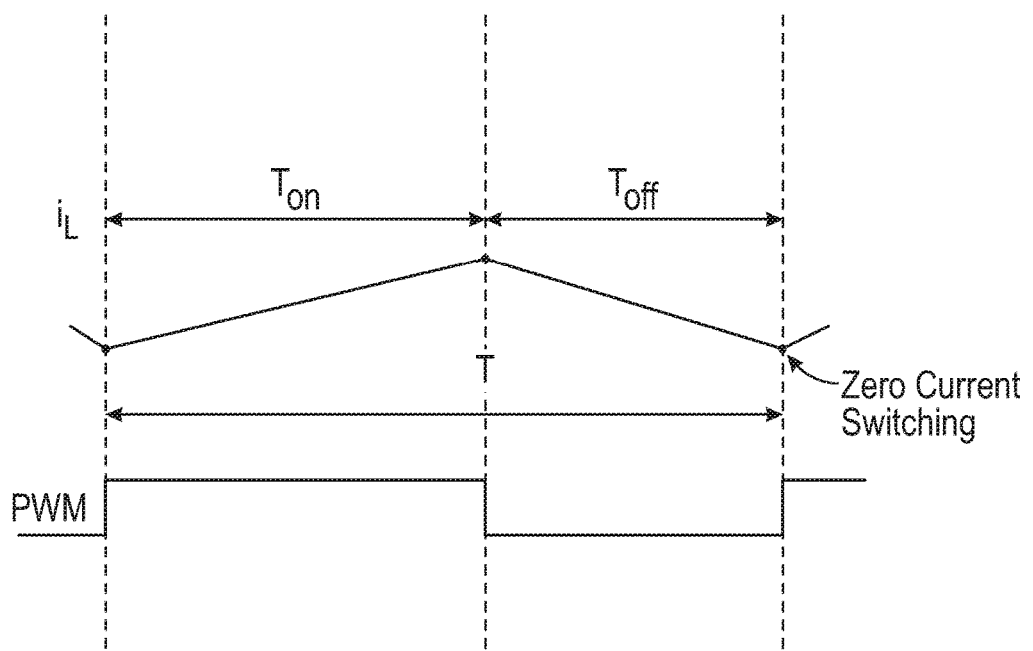
FIG. 2 shows a diagram of the inductor current $I_L$ in an exemplary schematic PWM switching cycle.

In typical BCM operation, a new switching period of the PWM is initiated when the current through the inductor 4, $I_L$, returns to zero. FIG. 2 shows a diagram of the inductor current $I_L$ in an exemplary schematic PWM switching cycle. The rising current slope typically may correspond to $V_{IN}/L$ and the falling current slope may typically correspond to $$\frac{(V_{IN} - V_{OUT})}{L}.$$

As can be seen from the bottom part of FIG. 2, a PWM control signal is applied to MOSFET 5. When the PWM signal is high, MOSFET 5 is conductive and the current $I_L$ in the inductor 4 increases. This time period is described herein as $T_{ON}$ time or on-time period. Both terms are used interchangeably herein. Once the desired charge of inductor 4 is reached, the PWM signal is controlled to low and MOSFET 5 is set non-conductive. The current $I_L$ gradually decreases until the inductor 4 is fully discharged. This time period is described herein as $T_{OFF}$ time. Both, $T_{ON}$ and $T_{OFF}$ are a PWM/switching cycle T.

When the inductor 4 is fully discharged, i.e., at a "zero-current point" in time in the PWM cycle, the next PWM cycle begins. The PWM signal correspondingly is controlled high and MOSFET 5 is switched conductive.

As discussed in the preceding, BCM avoids switching losses in view that the MOSFET 5 is controlled from an off-state to an on-state when no substantial current flows, which is referred to herein as "zero-current switching".

Figure 3:
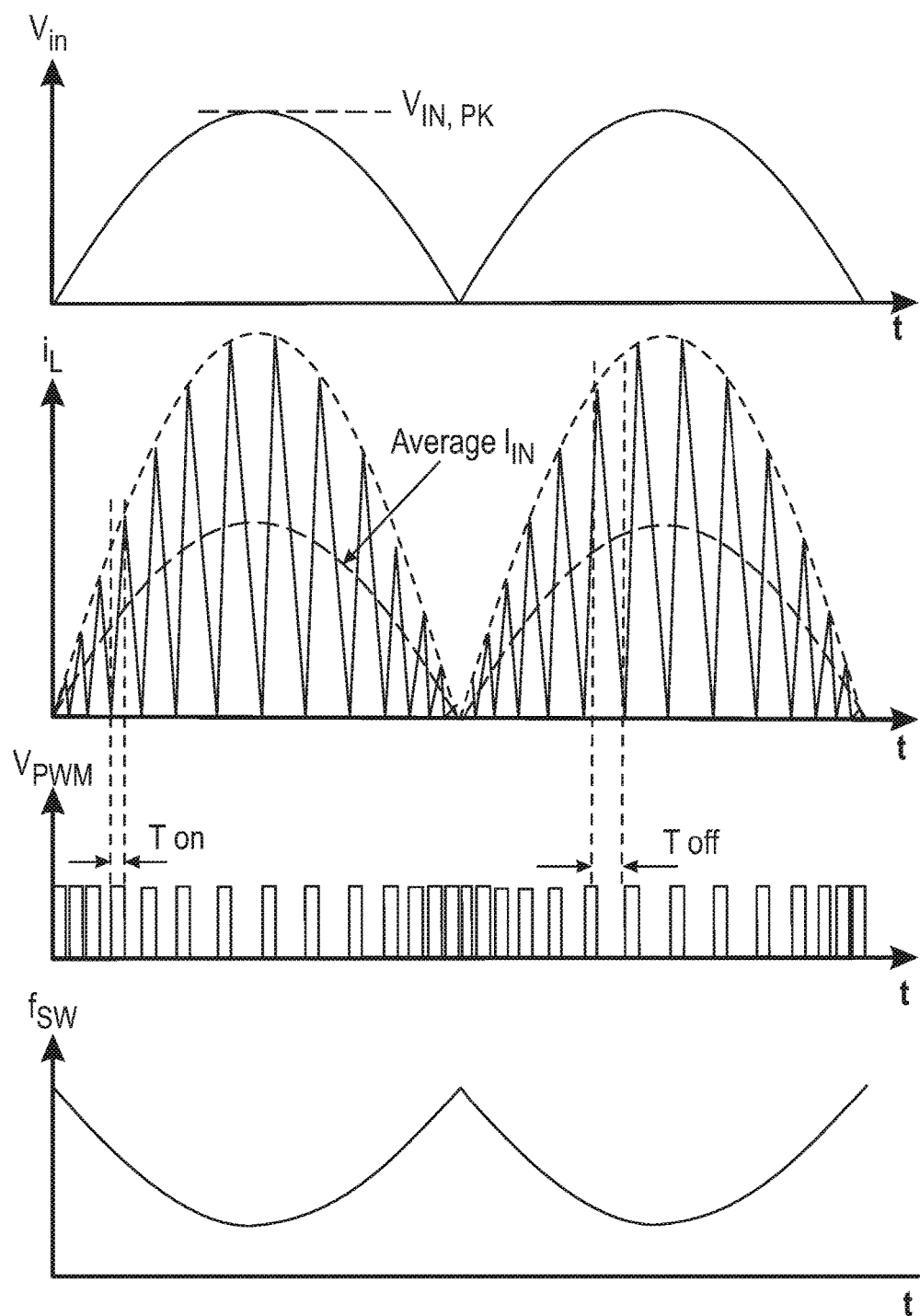
FIG. 3 shows diagrams of the operation of the circuit arrangement of the embodiment of FIG. 1 during a full cycle of AC input voltage $V_{IN}$.

FIG. 3 shows diagrams of the operation of the circuit 1 during a full cycle of AC input voltage $V_{IN}$. As will be apparent from the FIG., the inductor 4 is charged and discharged multiple times in each half-cycle of the input voltage in accordance with the PWM signal, shown in FIG. 3 as $V_{PWM}$. The converter circuit 1 operates with a variable switching frequency, which depends primarily on the desired output reference voltage $V_{O,ref}$, the instantaneous value of the input voltage $V_{IN}$, the inductor value of inductor 4, and the output power delivered to the load $R_L$ 11.

The operating frequency changes as the input current follows the sinusoidal input voltage waveform, as shown in FIG. 3. The lowest frequency occurs at the peak of sinusoidal input, i.e., line voltage. As will be apparent from FIG. 3, and since the current waveform of $I_L$ is roughly triangular, the average value in each PWM period is proportional to the input voltage $V_{IN}$. Thus, provided a sinusoidal $V_{IN}$, the input current $I_{IN}$ of the circuit 1 follows the waveform of $V_{IN}$ with high accuracy and draws a sinusoidal input current from the mains. Accordingly, operating the converter 1 in BCM is ideal for power factor correction (PFC).

Reverting to FIG. 1, to allow BCM operation, the signal processor 9 is configured to receive a first voltage signal that corresponds to the rectified mains voltage $V_{IN}$ at a first voltage input 12. A second voltage signal is provided to second voltage input 13. The second voltage signal corresponds to the output voltage $V_{OUT}$. Both voltage signals in the embodiment of FIG. 1 are obtained over corresponding voltage dividers, formed by resistors $R_x$ and $R_y$ for the input side and $R_z$ and $R_w$ for the output side.

The signal processor 9 takes samples of the first voltage signal and the second voltage signal. The sampling of the input and output voltage signal should be done ideally at $T_{ON}/2$, i.e., at half of a switching cycle for obtaining suitable averages.

Signal processor 9 is configured to sample the voltage signals at $T_{ON}/2$ when the duty cycle of the PWM is lower than 50%, i.e., when $V_{IN} > V_{OUT}/2$. This provides that the period corresponds to the average of the input voltage. The bulk of the power transfer occurs during this interval. Since the duty cycle and the frequency are low in this case, there is adequate time for calculating the next zero-current point and the switching period.

For the remainder of the input voltage half-wave, the sampling frequency goes higher towards the zero-current point and there is no adequate time for computation if sampling would be done at $T_{ON}/2$. Instead, for a duty cycle of equal to or higher than 50%, the signal processor 9 is configured to sample the voltage signals near the start of the cycle, for example after a small delay of 100 ns for switching transients to die down. Since the input voltage is small compared to its peak, the difference between the values sampled at start and $T_{ON}/2$ is not significant.

Using the two voltage signals, corresponding to $V_{IN}$ and $V_{OUT}$, as well as a predefined output voltage reference $V_{O,REF}$, provided by an internal memory 40a of signal processor 9, the signal processor 9 calculates the zero-current points in each PWM cycle, i.e., the point in time, where the inductor current $I_L$ reaches zero. It is noted, that signal processor 9 in this embodiment does not measure the inductor current $I_L$ directly, which provides a particularly cost effective and compact setup.

To obtain the on-time period $T_{ON}$, the signal processor uses the aforementioned voltage signals, the predefined output voltage reference $V_{O,REF}$ and a predefined peak voltage $V_{PK, REF}$.

The functionality of signal processor 9 to obtain the discussed zero-current points as well as the duration of the on-time period will be discussed in more detail with reference to FIG. 4, which shows a schematic block diagram of an embodiment of signal processor 9 of FIG. 1.

The first (corresponding to $V_{IN}$) and second (corr. to $V_{OUT}$) voltage signals are received at the respective inputs 12 and 13. The predefined output voltage reference $V_{O,REF}$ and the predefined peak voltage $V_{PK, REF}$ are obtained from memories 40a and 40b. The two voltage signals (corr. $V_{IN}$ and $V_{OUT}$) are provided to operational amplifiers 41a, 41b for signal conditioning and then provided to analog-to-digital (ADC) circuits 42a, 42b. The two ADC circuits 42a, 42b convert the voltage signals to digital information and are of 12-bit type with a Vmin: 0V and a Vmax: 3.3V.

Signal processor 9 further comprises multiple modules to provide the total PWM cycle time T and the on-time $T_{ON}$ to an internal PWM generator 50. As shown in the upper part of FIG. 4, subtraction module 43 and division module 44 provide $$\frac{V_{OUT}}{(V_{OUT} - V_{IN})}$$

to multiplication module 45. The upper path, shown in FIG. 4, is a high frequency execution path to compute the PWM period value T, operating at a maximum frequency in this embodiment of 500 kHz.

Figure 4:
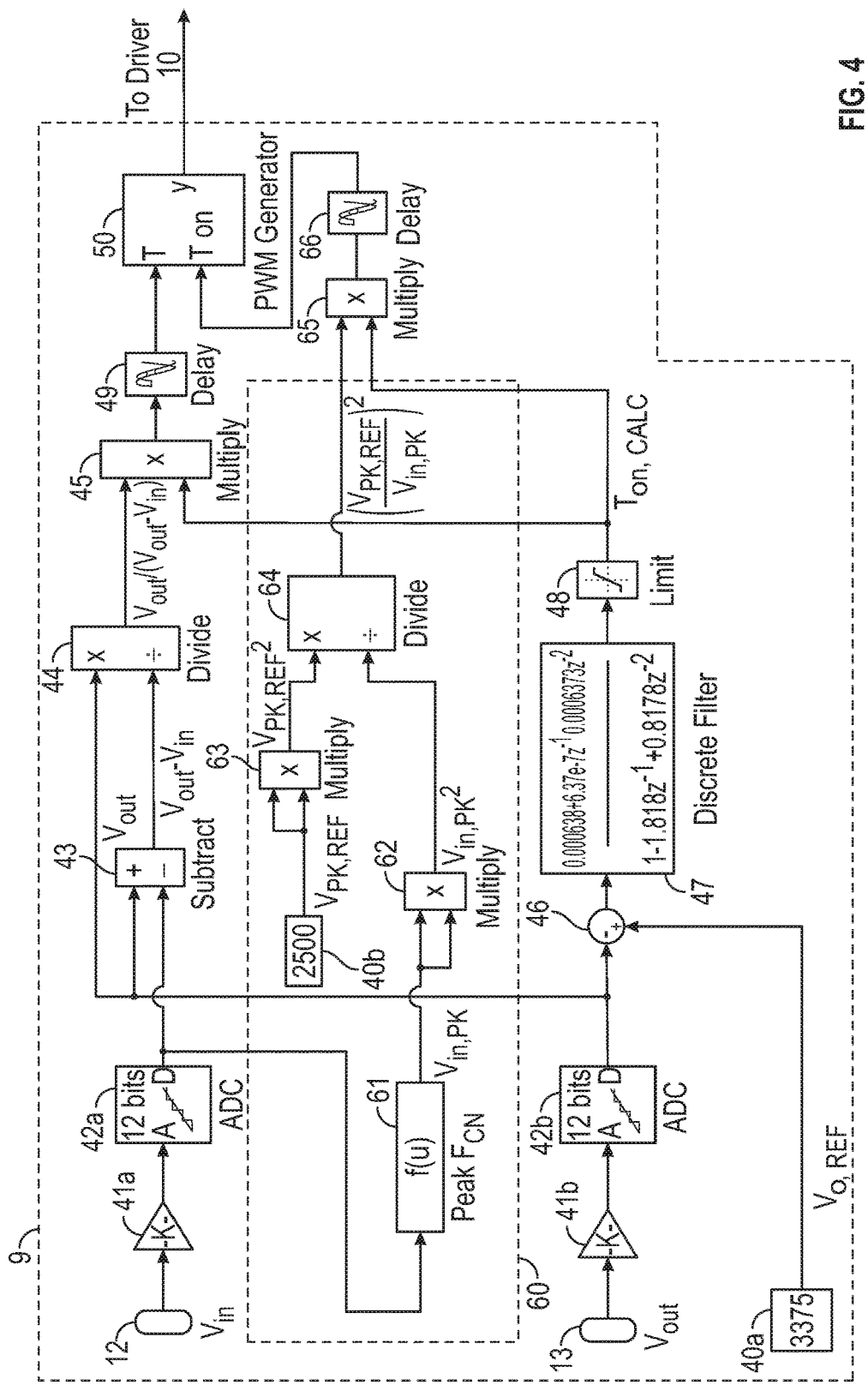
FIG. 4 shows a schematic block diagram of an embodiment of the operation of signal processor 9 of FIG. 1.

In the lower part of FIG. 4, the necessary on-time for the PWM, $T_{ON, CLC}$, is calculated from $V_{OUT}$, i.e., the current output voltage and the predefined output voltage reference $V_{O,REF}$. Summing node 46 compares the current output voltage $V_{OUT}$ with the "set point" $V_{O,REF}$. The resulting error signal is provided to filter/compensator 47, which runs at a relatively low frequency, e.g., 10 Hz, to remove second harmonic components, typically present in the output voltage your.

The filtered error signal is provided to limiter 48. The limiter 48 provides safety, in particular in a load side short circuit situation. During a short circuit on the output/load side, the ON time of MOSFET 5 tends to go higher. Limiter 48 limits the maximum on time $T_{ON, CLC}$, and thus the maximum power, fed to the output. Accordingly, a short circuit situation is safely handled. If both, the input voltage and the on-time are within limits, an over power condition does not arise.

Multiplier 45 receives the correspondingly processed error signal as on-time $T_{ON}$ and correspondingly provides $$\frac{V_{OUT}}{(V_{OUT} - V_{IN})} \times T_{ON}$$

to delay 49 and subsequently to PWM generator 50 as total PWM period time T.

As mentioned in the preceding, delay 49 is coupled between multiplier 45 and the PWM generator 50. The delay 49 provides to slightly delay the moment, the MOSFET 5 is switched to the on-state past the "true" moment, the current in inductor 4 reaches zero. The reason being that considering typical parasitic capacitances, in particular in MOSFET 5, the actual zero moment of the inductor 4 is not ideal for the switching in view the voltage across the parasitic capacitance of MOSFET 5 in this case would discharge through the MOSFET 5. To counter this loss, delay 49 is provided. Delay 49 further compensates a propagation delay, introduced by the generator 50. The delay time is predefined, based on the parasitic capacitance value. Typical delay times range between 100 ns and 500 ns. Accordingly, it is noted that in view of the rather small delay introduced in the switching of MOSFET 5, the delayed switching points are still considered as zero-current points herein.

The signal processor further comprises a crossover frequency control module 60, as shown in FIG. 4. The crossover frequency control module 60 determines a correction factor for the calculated on-time period $T_{ON, CALC}$ to provide a constant open loop gain crossover frequency, i.e., independent of changes of one or more of input voltage, switching frequency, and load. A constant open loop gain crossover frequency provides a more uniform transient response for varying load and voltage conditions.

A main idea behind the operation of the crossover frequency control module 60 is that, when considering the closed-loop model of a switched mode power converter operating in BCM mode, the open loop gain crossover frequency is dependent on the DC gain of the converter, the latter of which is proportional to the square of the input voltage and the load resistance in the constant current mode of operation.

Accordingly, the crossover frequency control module 60 in each half-cycle of the input voltage determines a cycle peak voltage level $V_{IN, PK}$ in peak function sub-module 61 and the square of the cycle peak voltage level $V_{IN, PK}$ in sub-module 62. As discussed in the preceding, the predefined peak voltage $V_{PK, REF}$ is obtained from memory 40b and the square of the predefined peak voltage $V_{PK, REF}$ is calculated in sub-module 63. The predefined peak voltage $V_{PK, REF}$ is predefined to the operating peak voltage of the circuit 1, i.e., to $V_{PK,REF} = V_{RMS} * \sqrt{2}$. For example, in case the circuit 1 is operated at a voltage of 15 $V_{RMS}$, $V_{PK, REF}$ is set to $15*\sqrt{2}$.

The predefined peak voltage can be set to any voltage in the operating range or beyond. Typically, it may be set to either lowest or highest operating input voltage depending on the desired crossover point. For instance, in a power supply with an input range of 85 $V_{RMS}$-265 $V_{RMS}$, the predefined peak voltage can be set to $85*\sqrt{2}$ or $265*\sqrt{2}$. Typically, at the lower end of the input voltage, the gain is lower, while at higher end, the gain is higher. Due to this, the crossover frequency at a lower input voltage is lesser than at the higher input voltage. One point to consider is that the input voltage is used for design of the control loop. For instance, in most cases, the lower input voltage is used for the design of the control loop. In such cases, it would be beneficial to consider the lower input voltage for calculating $V_{PK,REF}$.

Sub-module 64 calculates the ratio of square of the predefined peak voltage $V_{PK, REF}$ to the square of the cycle peak voltage level $V_{IN, PK}$. The result is multiplied with the calculated on-time $T_{ON, CALC}$ in submodule 65 to correct the on-time period in case of a load change.

For example, in case of a sudden load increase at the output 8, the output voltage $V_{OUT}$ will drop. This causes the summing node 46 to increase $T_{ON,CALC}$. However, an increased $T_{ON,CALC}$ would lead to a differing crossover frequency, depending on the input voltage, as $T_{ON,CALC}$ is proportional to $V_{IN}^2$. By multiplying $T_{ON,CALC}$ with $$\left(\frac{V_{PK,REF}}{V_{IN,PK}}\right)^2,$$

the effect of $V_{IN}$ is neutralized and the response to a step load increase is fixed.

Certainly, the determination of the cycle peak voltage level $V_{IN,PK}$ one half-cycle, however, a correction of the on-time period at the beginning of the subsequent half-cycle, i.e., at a time, where minimum power is handled, provides significant compensation.

The functionality of delay module 66 corresponds to the functionality of delay module 49. $T_{ON}$ is then provided to the PWM generator 50.

Using T and $T_{ON}$, the PWM generator 50 can provide the appropriate PWM timing settings to PWM driver 10 and to the gate of MOSFET 5. In view that the calculations conducted are based upon $V_{OUT}$ and $V_{IN}$, the zero-current point in each PWM cycle is reliably determined and simultaneously, a fixed crossover frequency is provided.

Figure 5:
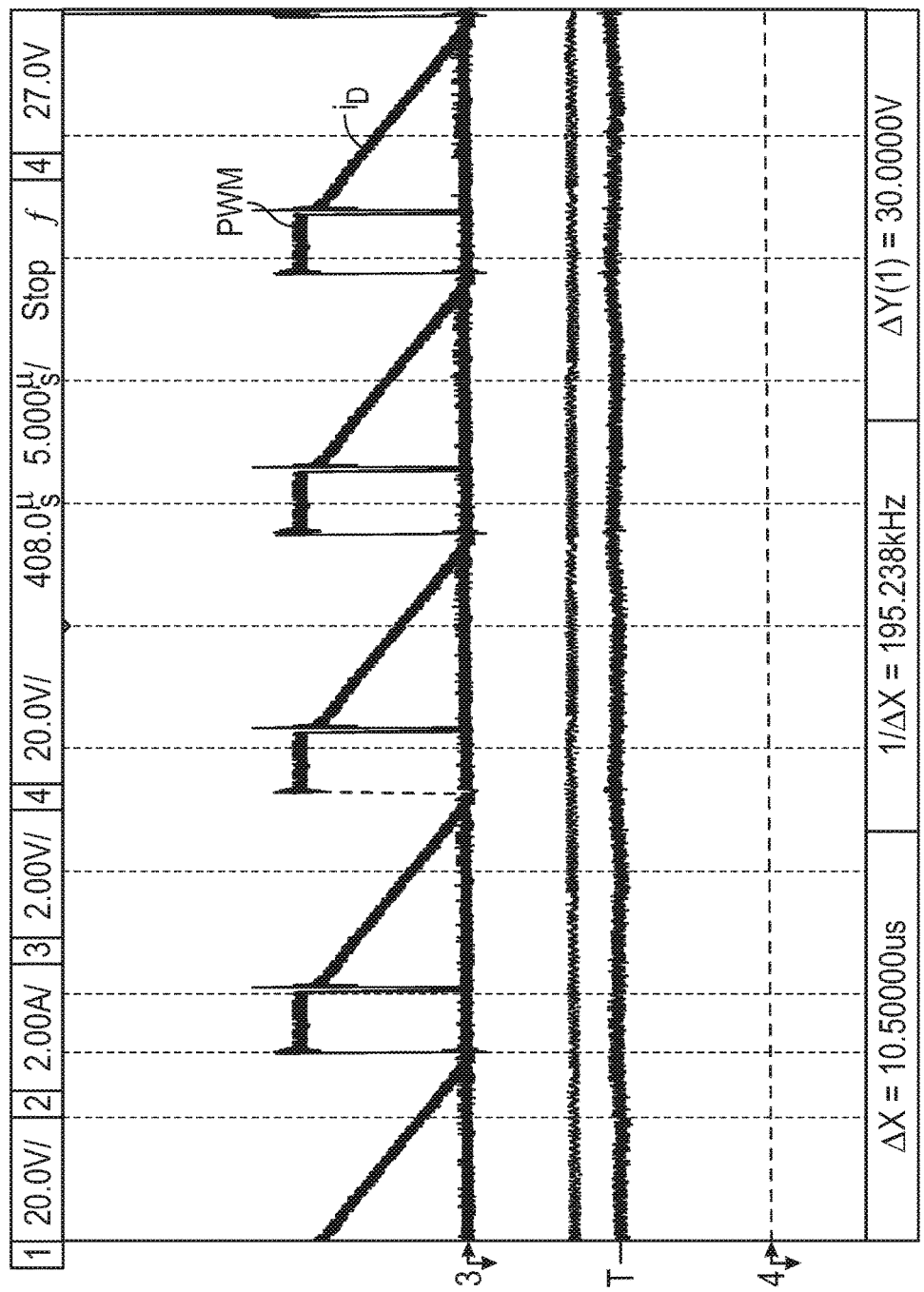
FIGS. 5 to 6 show waveforms of the operation of the circuit arrangement of the embodiment of FIG. 1.
Figure 6:
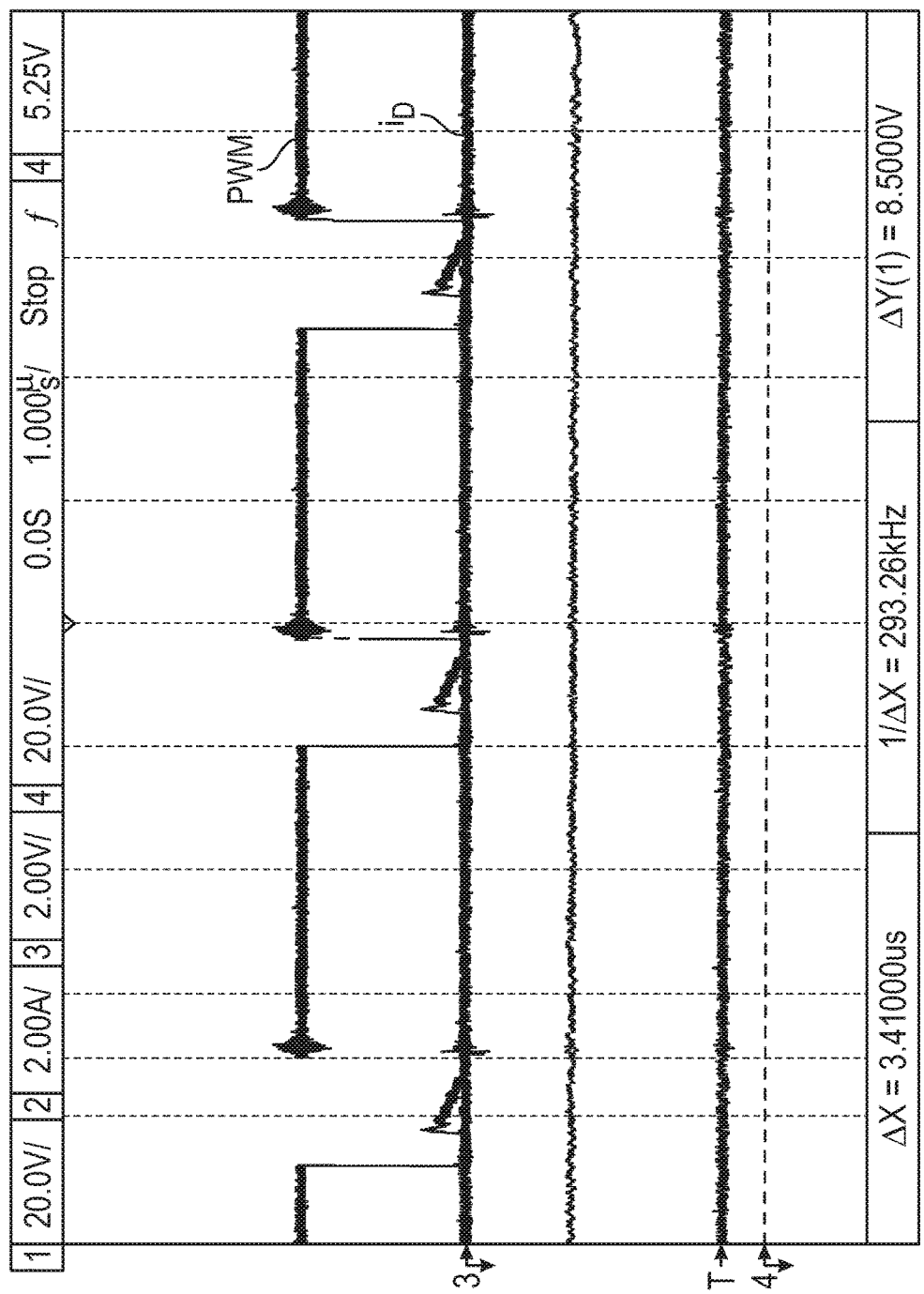

FIG. 5 shows the diode current $i_D$ near the peak of the input voltage. FIG. 6 shows the diode current $i_D$ near zero of the input voltage.

Figure 7:
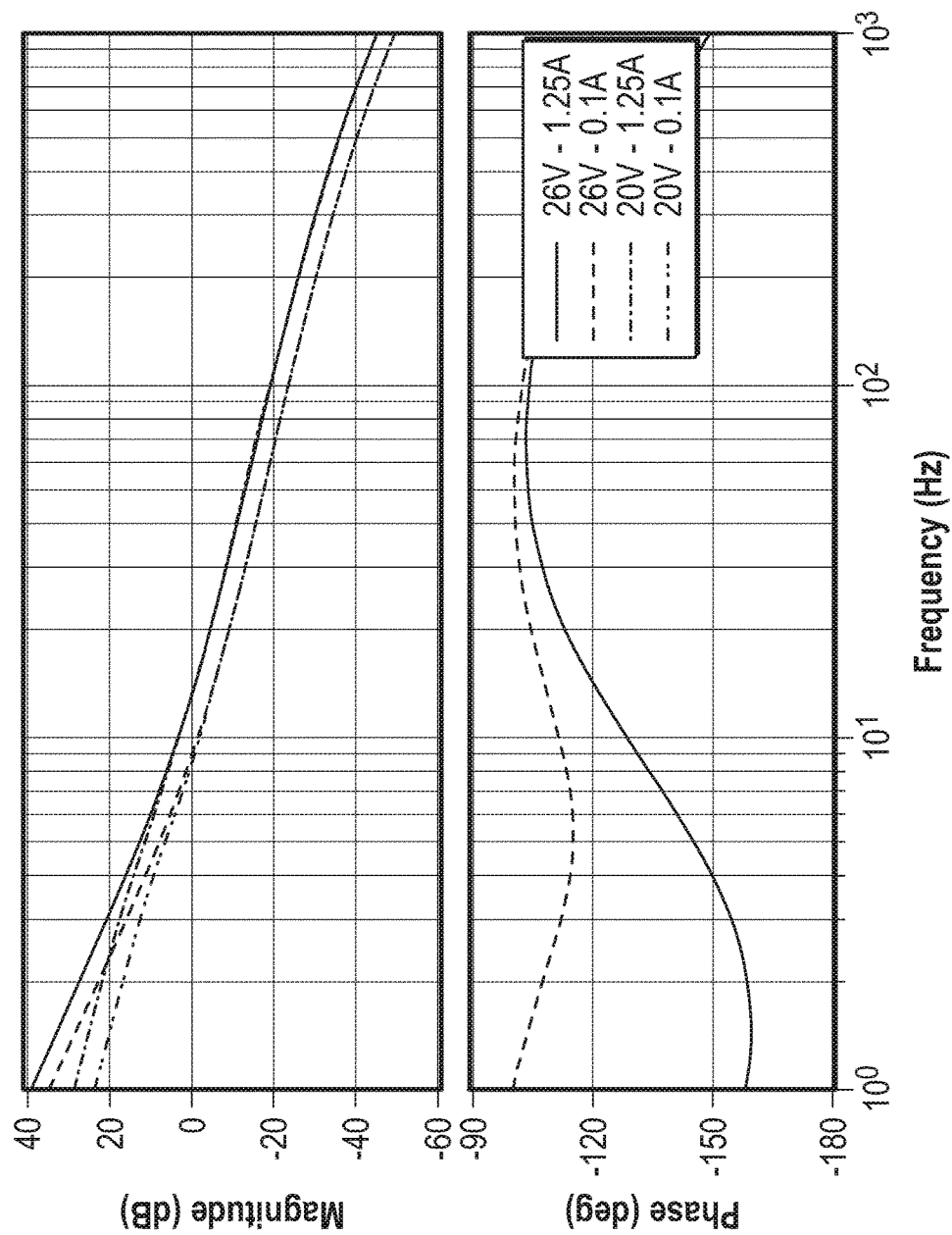
FIG. 7 shows a bode diagram of the operation of a circuit arrangement without crossover frequency control module.
Figure 8:
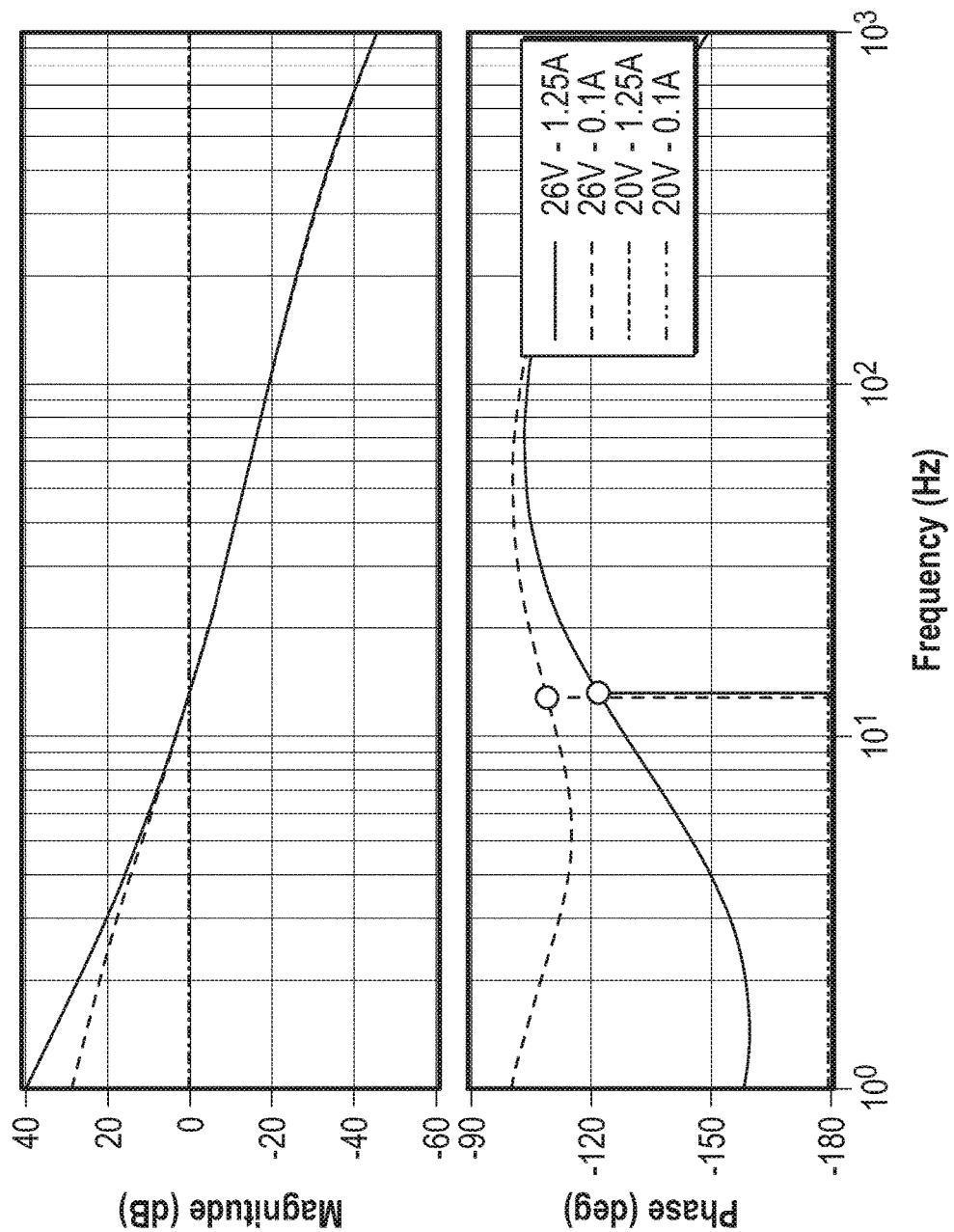
FIG. 8 shows the diagram of FIG. 7, when employing a circuit arrangement with a crossover frequency control module.

FIG. 7 shows a bode diagram of a circuit arrangement without crossover frequency control module 60, while FIG. 8 shows the same diagram of circuit arrangement 1 with crossover frequency control module 60. Both FIGS. show various input voltage/load conditions. It is noted, that the plots of FIGS. 7-8 refer to operation of the circuit arrangement 1 at an input voltage of 20V and 26V (RMS).

As can be seen from FIG. 8, all plot lines cross the 0 dB magnitude line at the same frequency. Consequently, the crossover frequency is independent of the input voltage and load condition. Table 1 below shows the data of the examples of FIG. 7, i.e., of a circuit arrangement without crossover frequency control module 60.

TABLE 1

| No. | Input Voltage (V) | Load Current Io (A) | Crossover Frequency (Hz) | Phase Margin (Deg.) | Gain Margin (dB) |
|---|---|---|---|---|---|
| 1 | 12 | 0.1 | 4.53 | 39 | 55 |
| 3 | 20 | 0.1 | 9.38 | 49.07 | 47.7 |
| 4 | 20 | 1.25 | 7.37 | 55.56 | 40 |
| 5 | 26 | 0.1 | 13.44 | 53.7 | 43 |
| 6 | 26 | 1.25 | 13.98 | 66.97 | 33 |

TABLE 2

| Sl. No | Input Voltage (V) | Load Current Io (A) | Crossover Frequency (Hz) | Phase Margin (Deg.) | Gain Margin (dB) |
|---|---|---|---|---|---|
| 1 | 12 | 0.1 | 15.82 | 60.07 | 40 |
| 2 | 20 | 0.1 | 15.82 | 61.55 | 43 |
| 3 | 20 | 1.25 | 15.82 | 47.17 | 34 |
| 4 | 26 | 0.1 | 15.82 | 60.72 | 42 |
| 5 | 26 | 1.25 | 15.82 | 58.31 | 35 |

Table 2 shows data of the examples of FIG. 8, i.e., of a circuit arrangement 1 with crossover frequency control module 60 and using $V_{PK,REF}=27V$.

Figure 9:
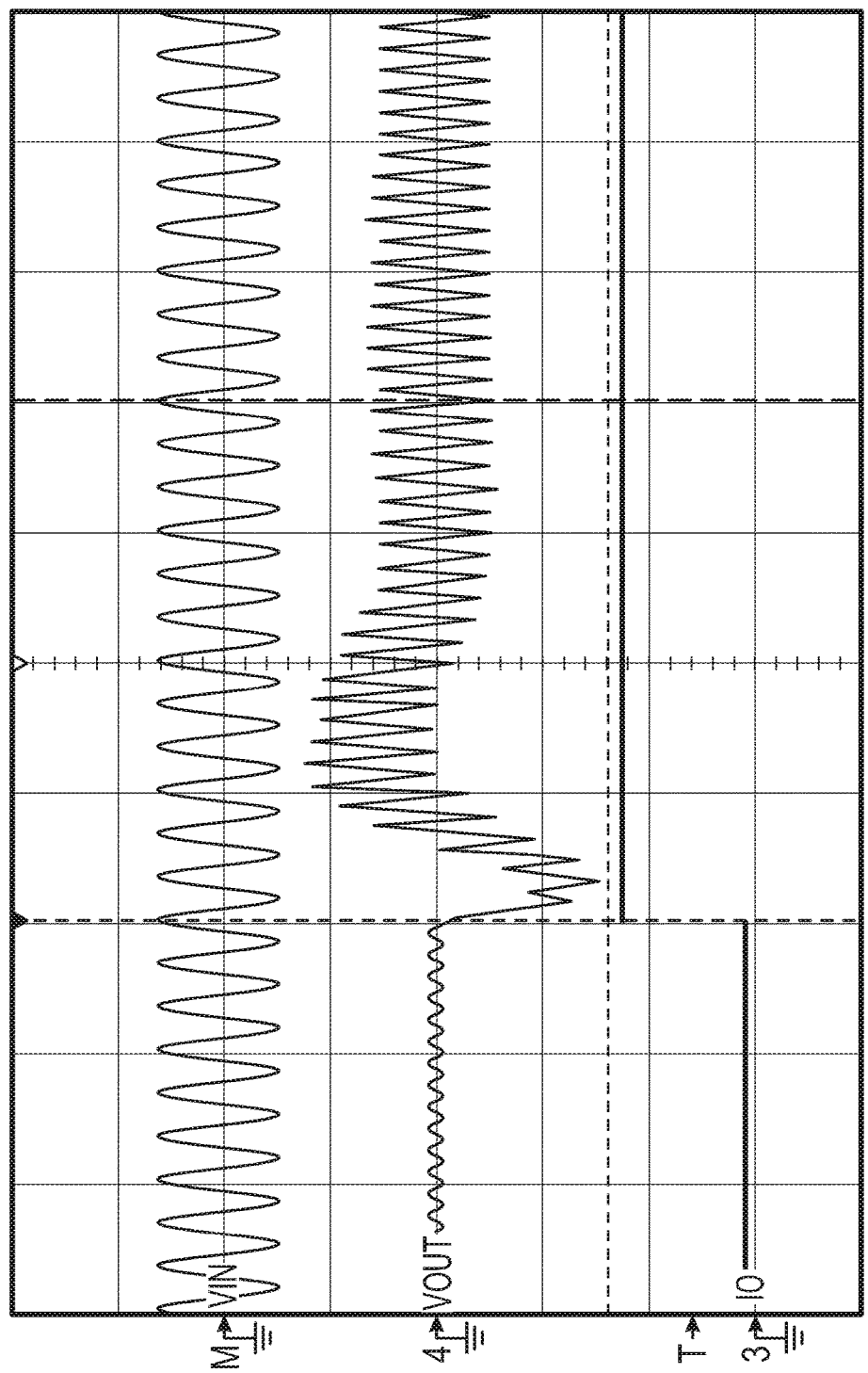
FIGS. 9-10 show oscilloscope plots of step responses when operating a circuit arrangement without and with a crossover frequency control module.
Figure 10:
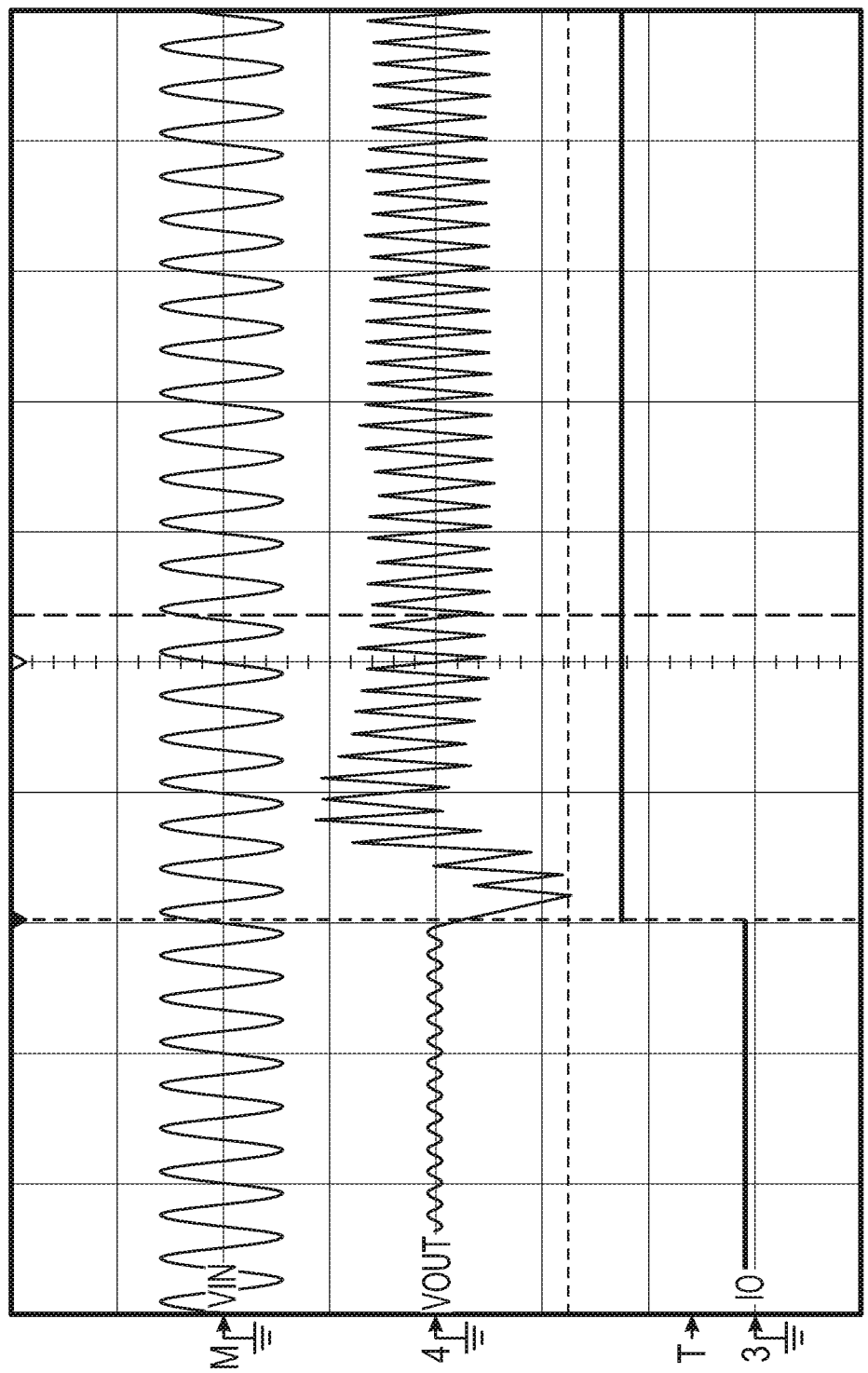

FIG. 9 shows an oscilloscope plot of a step response of a circuit arrangement without compensation, i.e., without crossover frequency control module 60. FIG. 9 shows a step response, i.e., the drop in the output voltage amplitude (\TOUT) at an input voltage of 20 $V_{RMS}$ upon load change from a load of 0.1 A to a load of 1.25 A. FIG. 10 shows an oscilloscope plot of the step response, corresponding to FIG. 9 using a circuit arrangement with compensation, i.e., with crossover frequency control module 60. Without the compensation algorithm, the drop varies and is a function of the input voltage and the load step size. When applying the compensation, the drop depends on the crossover frequency, and is fixed independent of load steps and input voltage. FIG. 9 also shows a significantly higher drop, compared to FIG. 10.

Figure 11:
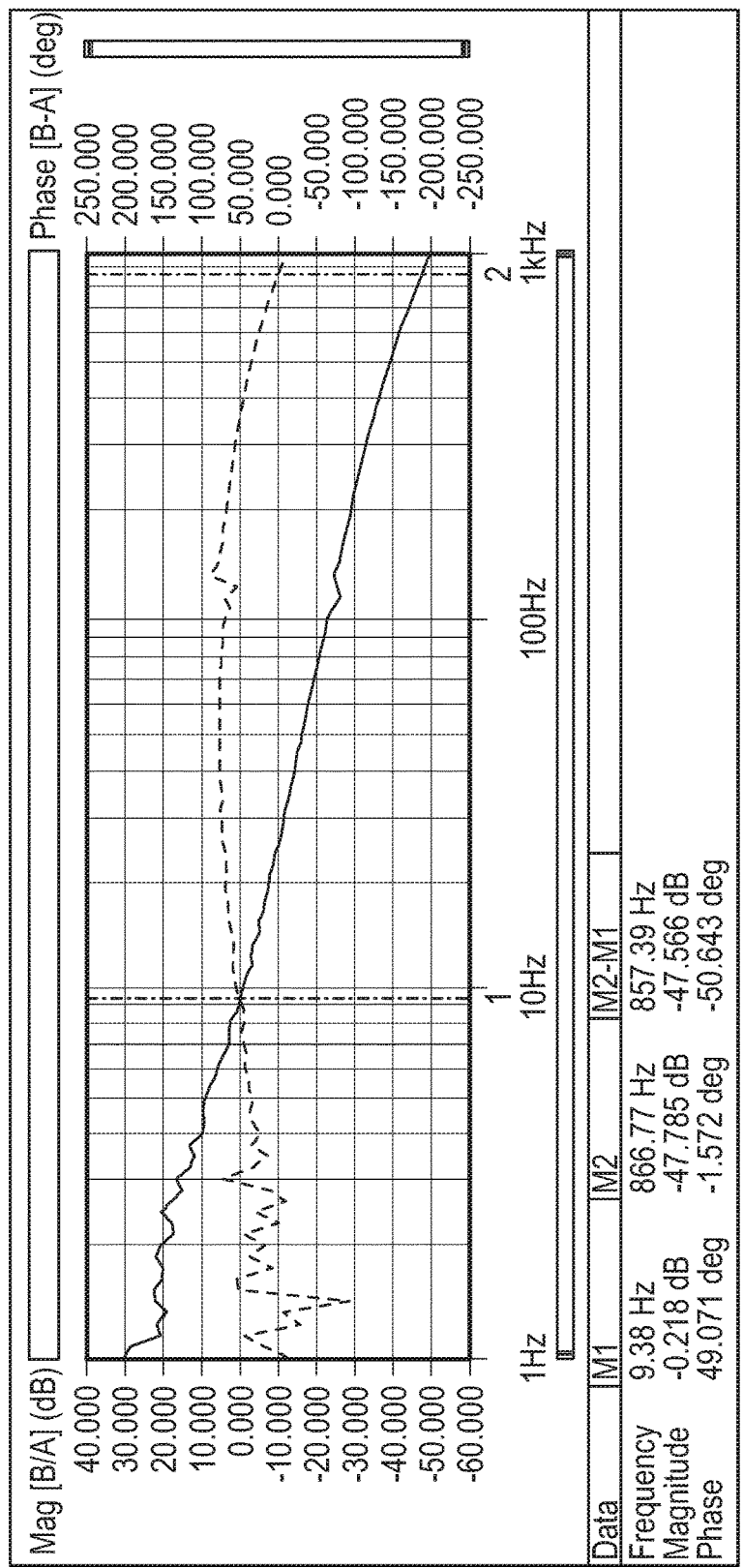
FIGS. 11-12 show bode plots of the operation of a circuit arrangement without and with a crossover frequency control module.
Figure 12:
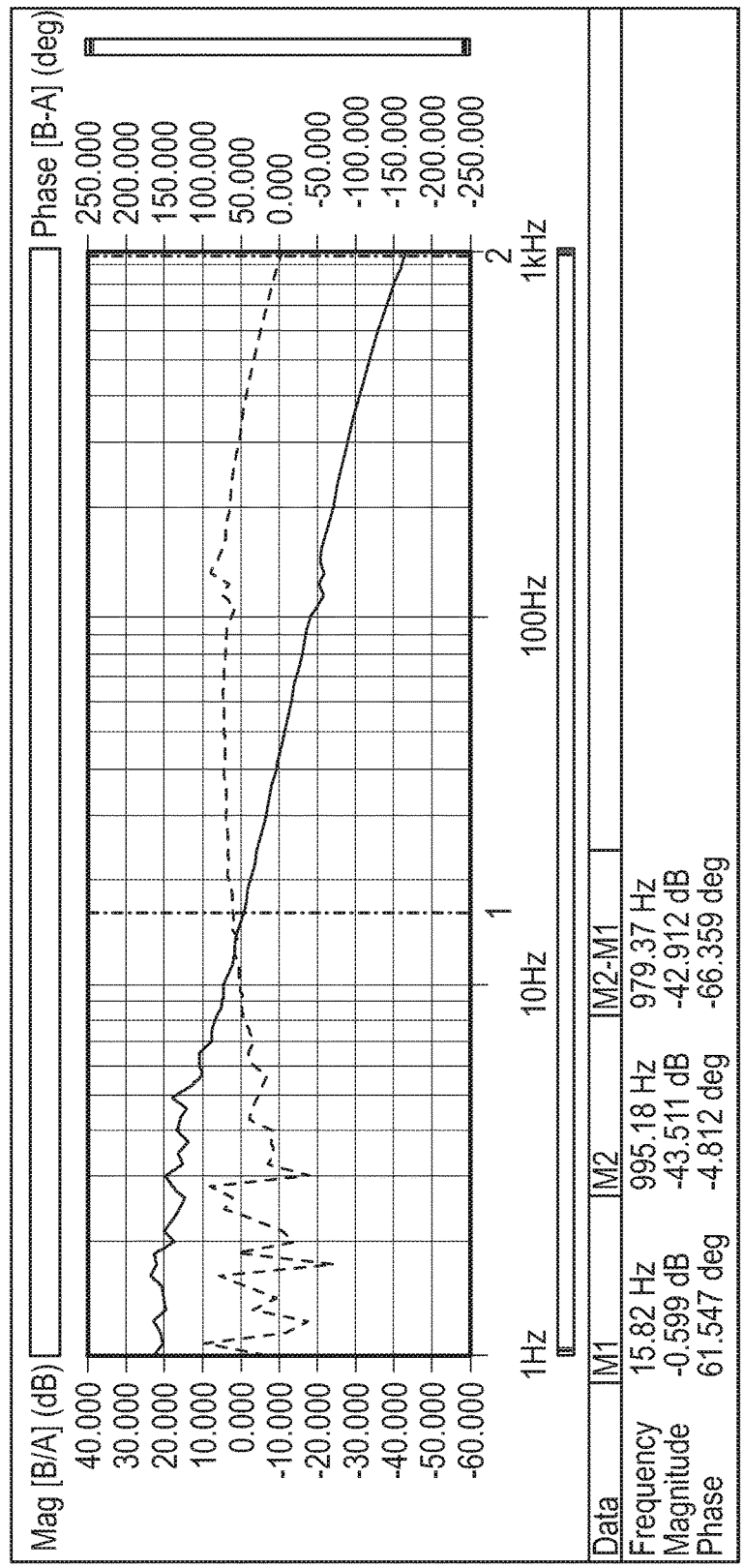

FIG. 11 shows a bode diagram of a circuit arrangement without compensation (at $20V_{RMS}$, 0.1 A load) and FIG. 12 shows a bode diagram of a circuit arrangement with compensation. The FIGS. show the crossover frequencies in the uncompensated and compensated implementations. The underlying data is tabulated in Tables 1 and 2. The data at the bottom of the Bode plots under the M1 marker shows the 0 dB (close to 0 dB, limited by Bode analyzer resolution) crossover point. Note, that it is 9.38 Hz in FIG. 11 and 15.82 Hz in FIG. 12.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment in which:
- instead of or in addition to inductor 4, a capacitor is used as an energy storage device;
- an EMI (electromagnetic interference) filter is included and designed to pass lower frequency components and attenuate the higher frequency components;
- instead of using the two voltage signals, corresponding to $V_{IN}$ and $V_{OUT}$, as well to determine the zero-current points in each PWM cycle, the inductor 4 current may be measured using a coupled inductance and/or a current transformer and/or
- filter/compensator 47 is a 2P2Z or a PID controller;

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module, or other unit may fulfill the functions of several items recited in the claims.

The mere fact that certain measures are recited in mutually different dependent claims does not indicate that a combination of these measured cannot be used to advantage. Any reference signs in the claims should not be construed as limiting the scope.

Appendix

The present disclosure relates to power supplies and controllers for electronic devices and, more particularly, to digital control of boundary mode PFC for constant crossover frequency.

Embodiments of the present disclosure include power controllers, implemented in any suitable combination of analog circuitry, digital circuitry, or instructions for execution by a processor. The power controllers may use PFC and, more particularly, boundary mode PFC. Boundary mode PFC may include a variable frequency topology where the switching frequency varies over the AC line cycle. The variable frequency is due to the switching at zero inductor current instant. The frequency is primarily dependent on the input voltage, output load, and inductor value. The control system consists of a voltage loop, which provides low bandwidth on time for the switches. The control system is designed for worst case transient condition. The transient response of the converter depends on the switching frequency, input voltage, and output load. The crossover frequency of the open loop gain is a good estimate of the transient response. In one embodiment, the crossover frequency is held constant independent of the input voltage or load changes, and thus guarantees a uniform transient response. Thus, such a controller works with a single stage or multi-stage interleaved converters operating in boundary mode.

Boundary mode PFC may use boost topology, AC input, DC output, a single voltage loop, constant on time, a switch turn off of at zero current, variable frequency, and may or may not use interleaving.

Embodiments of the present disclosure may perform a fixed transient response. The fixed transient response may be based on a fixed crossover frequency. The fixed transient response may be independent of input voltage variation. The fixed transient response may be independent of output load variation. The embodiments may result in high efficient, high power factors, and maximize digital control.

FIG. 1 illustrates a boundary mode PFC. A look at the closed loop model of a boundary mode PFC indicates that the crossover frequency is dependent on the DC gain of the system. The DC gain is proportional to square of the input voltage and load resistance in the constant current mode of operation. The solution consists of identifying an input reference voltage, which is generally the peak of the highest operating voltage. In every cycle of the input AC mains, the peak of the input voltage is measured. The ratio of square of reference peak voltage to measured peak voltage is multiplied to the output of the control loop, which will provide the required $T_{on}$. This solution works across the voltage and load range of the converter.

The PFC may be implemented in a Low Voltage PFC (LVPFC) board, a platform wherein customers can develop PFC algorithms at lower voltages without the risk of shock. The board includes two identical sections of boost converters, which convert AC input voltage to DC output voltage. The boundary mode operation has the advantages of higher efficiency and power factor. One of the drawbacks of this topology is the variation in switching frequency over the line cycle. Towards zero crossing of the AC line cycle, the frequency is highest, while the frequency is lowest at the peak. The new PWM switching cycle is synchronized with zero inductor current. The zero inductor current instant can be sensed using current sensor or coupled inductor or can be determined by dsPIC calculations.

Input to the circuit is the AC main supply of 110V, 60 Hz or 230V, 50 Hz. The input voltage is rectified using a bridge rectifier, and fed to a boost circuit comprising of an inductor, switch, and diode. In case of interleaved converters, there will be N boost stages, with each boost stage designed to handle a power of PIN, with adequate margins. The input and output capacitors are common to all the boost stages, and can be lumped or distributed. The dsPIC samples the input and output voltage at the same instant using two ADCs, and controls the gate waveforms of the switches. The zero switching instant for each stage can be determined by using a coupled inductor or inductor current sensing. In both the cases, a comparator within the dsPIC receives the sensing signal.

FIG. 4 shows the algorithm running inside the dsPIC. The dsPIC computes the ON time using a digital filter and the difference between reference output voltage and the actual output voltage. A 2P2Z compensator is chosen for digital filter implementation. The 2P2Z compensator allows the user to select two poles and a single zero location. The bandwidth of the output voltage is kept low to prevent input current distortion. This leads to a constant ON time over AC line cycle for a given input voltage and output load. The gating pulse to the switch (MOSFET) is HIGH during the ON time and LOW during the OFF time. The PWM cycle is restarted when the inductor current through the goes to zero. The dsPIC also samples the input voltage periodically and calculates the peak of the input waveform in each input AC cycle. Calculations include computing the square of ratio of peak of the reference voltage to the measured peak value. This ratio is then multiplied with the computed ON time, and can be updated at zero crossing of the input voltage where minimum power is handled. Thus, FIG. 2 illustrates an algorithm for finding the constant crossover frequency.

FIG. 7 illustrates a bode diagram of performance of the system without use of the algorithm of FIG. 4. As seen from the plot, the crossover frequency of the system varies with the input voltage and the load resistance. FIG. 9 illustrates example step response at 26 Vrms, 0.1 A-1.25 A load. FIG. 10 illustrates example step response at 20 Vrms, 0.1 A-1.25 A load. FIG. 8 illustrates a bode diagram of performance of the system with use of the algorithm of FIG. 4. Notice that the gain plot crosses the 0 dB line at exactly the same frequency, there by resulting in a constant crossover frequency and a uniform transient response. The difference in the phase margin of the system under multiple conditions of input voltage and load reduces substantially with the algorithm. FIG. 11 illustrates step response of the system at 26 Vrms, 0.1 A-1.25 A when using the algorithm of FIG. 4. FIG. 12 illustrates step response of the system at 20 Vrms, 0.1 A-1.25 A when using the algorithm of FIG. 4.

Implementations of the PFC might be only possible using digital control. In contrast, boundary mode digital control has been traditionally used with analog controller solutions.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

In some embodiments, a controller is provided, comprising: a first input voltage; a second input voltage routed from an output voltage of a power supply; a circuit, configured to: identify a peak of input voltage from the first input voltage; and maintain a fixed crossover frequency based on the first input voltage; determine a crossover frequency.

In some embodiments, the circuit is configured to maintain the fixed crossover frequency by computing ON time.

In some embodiments, the circuit is configured to compute ON time using a digital filter and the difference between a reference output voltage and the second input voltage.

In some embodiments, the digital filter includes a compensator circuit with a selectable two poles and a single zero location.

In some embodiments, the circuit is configured to keep the output voltage is low to prevent input current distortion.

In some embodiments, the circuit is configured to maintain a constant ON time over AC line cycle for a given input voltage and output load.

In some embodiments, the circuit is configured to be restarted when inductor current goes to zero.

In some embodiments, the circuit is configured to sample inputs periodically and calculates the peak of the input waveform in each input AC cycle.

In some embodiments, the circuit is configured to compute a square of a ratio of peak of reference voltage to a measured peak value; multiply the ratio with the computed ON time; and updated at a zero crossing of the input voltage where minimum power is handled.

What is claimed is:

1. A circuit arrangement for switched boundary mode power conversion, comprising at least:
    an input for receiving an input voltage from a power supply;
    an output to provide an output voltage to a load;
    an energy storage device;
    a controllable switching device; and
    a signal processor, connected with the controllable switching device and being configured for zero-current switching of the switching device; wherein
    the signal processor is further configured to determine an on-time period for the switching device in one or more switching cycles based on the output voltage and the output of a crossover frequency control module, which crossover frequency control module is configured to provide a constant open loop gain crossover frequency to improve a transient response characteristic of the circuit arrangement.

2. The circuit arrangement of claim 1, wherein the crossover frequency control module is configured to provide the constant open loop gain crossover frequency substantially independent of changes of one or more of input voltage, switching frequency, and the load.

3. The circuit arrangement of claim 1, wherein the input voltage is an AC voltage having a plurality of half-cycles and the crossover frequency control module is configured to determine a cycle peak voltage level of the input voltage in multiple half-cycles.

4. The circuit arrangement of claim 3, wherein the crossover frequency control module calculates a voltage ratio of a predefined peak voltage reference to the cycle peak voltage level.

5. The circuit arrangement of claim 4, wherein the crossover frequency control module sets the output of the crossover frequency control module corresponding to the voltage ratio.

6. The circuit arrangement of claim 4, wherein the crossover frequency control module sets the output of the crossover frequency control module corresponding to the square of the voltage ratio.

7. The circuit arrangement of claim 3, wherein the signal processor is configured to determine the on-time period for the switching device at a zero-crossing of the AC voltage.

8. The circuit arrangement of claim 1, wherein the signal processor is configured to determine the on-time period for the switching device based on a comparison of the output voltage with a predefined reference output voltage and the output of the crossover frequency control module.

9. The circuit arrangement of claim 1, wherein the signal processor is configured to determine the on-time period for the switching device based on a comparison of the output voltage with a reference output voltage, the result being multiplied with the output of the crossover frequency control module.

10. The circuit arrangement of claim 1, wherein the signal processor during zero-current switching is configured to control the switching device at least at one zero-current point of the energy storage device.

11. The circuit arrangement of claim 10, wherein the signal processor is configured to control the switching device from an off-state to an on-state at the at least one zero-current point.

12. The circuit arrangement of claim 1, wherein the signal processor is configured to recurrently control the switching device at zero-current points.

13. The circuit arrangement of claim 1, wherein the signal processor comprises a delay module, configured so that the at least one switching point is delayed for a predetermined delay time.

14. The circuit arrangement of claim 1, wherein the signal processor comprises a PWM module for driving the switching device.

15. The circuit arrangement of claim 1, wherein the signal processor further comprises a limiter, configured to provide maximum on-time information to the PWM module.

16. The circuit arrangement of claim 1, wherein the signal processor is a digital signal processor comprising at least one analog-to-digital converter for converting at least one of a first or second voltage signal.

17. A signal processor for use in a circuit arrangement for switched boundary mode power conversion with at least a controllable switching device, said signal processor being connectable to the controllable switching device and being configured for zero-current switching of the switching device; wherein the signal processor is further configured to determine an on-time period for the switching device in one or more switching cycles based on the output voltage and the output of a crossover frequency control module, which crossover frequency control module is configured to provide a constant open loop gain crossover frequency to improve a transient response characteristic of the circuit arrangement.

18. A method of switched boundary mode power conversion with a circuit comprising an input for receiving an input voltage from a power supply; an output to provide an output voltage to a load; an energy storage device; and a controllable switching device; the method comprising
    determining one or more zero-current points of the energy storage device;
    determining one or more on-time periods based on the output voltage, wherein the one or more on-time periods are controlled for a constant open loop gain crossover frequency; and
    controlling the switching device according to the determined one or more zero-current points and the determined one or more on-time periods.

19. A machine-readable medium including contents that are configured to cause a signal processor to conduct the method of claim 18.

* * * * *